United States Patent Office 3,663,455
Patented May 16, 1972

3,663,455
METHOD OF PREPARING SUPPORTED OXIDATION CATALYSTS FOR PRODUCING ETHYLENE OXIDE
Benedetto Calcagno and Natale Ferlazzo, Milan, and Marcello Ghirga, Bresso, Italy, assignors to Società Italiana Resine S.p.A., Milan, Italy
No Drawing. Filed Nov. 19, 1969, Ser. No. 878,200
Claims priority, application Italy, Nov. 23, 1968, 24,087/68
Int. Cl. B01j 11/82
U.S. Cl. 252—443
5 Claims

ABSTRACT OF THE DISCLOSURE

A method for preparing a supported catalyst for use in oxidizing ethylene to ethylene oxide, said supported catalyst consisting essentially of silver to the extent of 7 to 30% by weight with respect to the support, and of a member selected from the group consisting of platinum, palladium and gold to an extent of from 0.01 to 1.0% by weight with respect to said silver, which comprises:
(a) impregnating a solid, inert subdivided support, at a temperature of from 60° C. to 115° C., with a solution of silver lactate in lactic acid containing in suspension, carbon and at least one metal selected from the group consisting of palladium, platinum and gold, said lactic acid being present in a molar excess of from 20% to 200% with respect to the number of mols required for complete salification of said silver,
(b) drying the particles thus impregnated in a stream of air at a temperature rising to a maximum, but not exceeding 130° C. for a period of from 1 to 3 hours, and
(c) subjecting the particles thus impregnated to a heat treatment, said temperature being raised gradually to a maximum level of between 230° C. and 360° C. over a period of 10 to 15 hours.

BACKGROUND OF THE INVENTION

(1) Field of the invention

The present invention relates to silver-containing catalysts supported on a base, for use in the preparation of ethylene oxide by the method whereby that compound is obtained by the high-temperature oxidation of ethylene in the presence of oxygen or an oxygen-containing gas.

(2) Description of the prior art

As is well known in the art, silver-containing supported catalysts can be obtained by the direct deposition of a coating of the catalytically active metal on an inert support.

Another method of depositing the active metal known in the art involves the impregnation of the support with a decomposable compound of the metal, which is then caused to decompose within the support and thus give the desired catalyst disposed throughout the support.

Such catalysts, however, are not entirely satisfactory for the said purpose; in particular, they are not very active and their mechanical characteristics are often poor because of the failure of the catalytic metal to adhere properly to the face of the support.

This latter phenomenon, as is well known, becomes more marked as the surface area of the catalyst is increased by, for example, the roughening of the surface of the metal.

In this way, the increase in activity due to the larger area of catalysis is usually accompanied by a worsening of the mechanical properties of the catalyst and the catalyst is therefore less useful.

It is known that the properties of catalysts, especially those of the supported type, depend not only on the materials used, but also on their method of preparation, every stage of which affects either their mechanical characteristics or their activity and selectivity.

SUMMARY OF THE INVENTION

Hence, the preparation of the catalysts with which the invention is concerned consists of a method which includes one stage in which the support is impregnated, another stage in which the impregnated support is dried and an activating stage carried out in special conditions that cannot be varied significantly without adversely affecting the properties of the finished catalyst. More particularly, the method here proposed consists essentially in:

The preparation of a fine suspension containing carbon and at least one metal taken from the group consisting of platinum, gold and palladium, in a solution of silver lactate in lactic acid;

The impregnation of an inert, subdivided support with the said suspension at temperatures ranging from 60° C. to 115° C.;

The drying of the impregnated particles by rolling in a stream of air at a temperature rising to a maximum not exceeding 130° C.;

The heat treatment of the impregnated particles, the temperature being gradually increased to a maximum level of between 230° C. and 360° C.

DETAILED DESCRIPTION OF THE INVENTION

The catalysts with which this invention is concerned have a content of silver, calculated as metal, of 7% to 30% by weight in relation to the support, while the content of platinum, gold or palladium may vary from 0.01% to 1.0% in weight with respect to the metallic silver.

Materials that can be used for the support include alumina, silicon carbide, magnesium oxide or combinations of those substances, especially in the form of spheres having a diameter of 4 mm. to 9 mm.

One substance that is particularly advantageous for the purpose is alpha alumina that has been activated by treatment at a temperature above 1,000° C. and has a surface area of from 0.01 to 1.0 sq. m./g. and a porosity of 10% to 40%, with pores having a mean diameter of between 30 and 150 microns.

For the purposes of the invention, the particles of the support are impregnated with a suspension, in lactic acid containing silver lactate, of carbon and one or more of the metals already mentioned, in a finely divided state.

One may use for this purpose the products commercially known as animal carbon, palladium carbon or platinum carbon, or carbon impregnated with colloidal platinum, in which the grain size lies between 0.1 and 100 microns.

It is preferable to use platinum carbon or palladium carbon, since these enable somewhat better catalysts to be obtained than when the carbon and metal are used separately.

In all cases, the amount of carbon used lies between 1 part and 20 parts per 100 parts by weight of metallic silver. The suspension also contains a quantity of catalytic metals such that the content thereof in the final catalyst falls within the range of values already stated, while the lactic acid is present in excess of 20% to 200% in mols with respect to the mols required for complete salification of the silver present.

The impregnation of the support particles can readily be carried out in equipment of the rotary evaporator type, the temperature being maintained between the limits already specified.

The impregnated particles are then rolled in a stream of air, the temperature being raised gradually to a maximum not above 130° C., for 1 hour to 3 hours.

Finally, the material dried in this way is activated by being gradually heated, over a period of 10 to 15 hours, to a maximum temperature of between 230° C. and 360° C.

The method here proposed is simple and economically advantageous and makes it possible to obtain catalysts of high activity and selectivity for use in processes in which ethylene oxide is prepared by the oxidation of ethylene in aqueous phase with oxygen or an oxygen containing gas.

These catalysts are highly active and permit selectivity levels of over 70% in the ethylene converted, conversion being of the order of 30% to 50% or more with respect to the ethylene put in, in processes in which an inert gas is used for diluting the reaction gases.

Moreover, the catalysts produced in accordance with this invention possess sufficiently high mechanical properties to enable them to be utilised commercially over long periods. In fact, these catalysts have been shown by abrasion tests to be as strong mechanically as the materials used for the support.

Finally, the catalysts described have proved particularly suitable for the production of ethylene oxide by the oxidation of ethylene in vapour phase, described in a previous patent application filed by the present applicants, the method in which consists substantially in feeding into the reaction chamber ethylene and oxygen, substantially pure, separately or mixed together, in such a way that the amount of ethylene in the gas at entry to the reaction vessel is over 86% by volume.

The process in question is carried out at temperatures of 150° C. to 450° C. and pressures between 1 atmosphere and 30 atmospheres, with contact periods of 1 second to 10 seconds.

The following experimental examples will serve to illustrate the invention further.

EXAMPLE 1

To 15.7 g. of lactic acid (80% strength) was added 500 mg. of carbon containing 5% by weight of platinum. Then 8.5 g. of silver oxide was added and the temperature brought to about 90° C.

This produced a solution of silver lactate in lactic acid, containing a fine suspension of platinum carbon.

Into a rotary evaporator, 50 g. of small spheres of alumina having a diameter of about 4 mm. was introduced at a temperature of 90° C. The suspension described was added and the whole was then left to cool to ambient temperature.

In this experiment, use was made of alpha alumina activated by being heated to 1,100° C., its surface area being less than 1 sq. m./g.

The impregnated spheres were then set rolling at 90° C. in a stream of air and the temperature was raised by 10° C. every 20 minutes until it reached 120° C.

Next, the dried spheres were placed in an oven at 115° C. and the temperature was raised to 180° C. over a period of 6½ hours.

Finally, they were treated in a muffle furnace, in which the temperature was raised to 280° C. in 5 hours, at which temperature the catalyst was maintained for the next two hours.

The finished catalyst had a silver content of 13.5% by weight, while the amount of platinum was equal to 0.15% by weight in relation to the metallic silver.

Moreover, the porosity of the catalyst was 25% calculated in terms of water per gramme of catalyst.

EXAMPLE 2

Of the catalyst prepared as described in Example 1, 16 g. was placed in a steel reaction vessel having an inside diameter of 7.8 mm.

A gas mixture containing 7.7% by volume of oxygen and 6.6% by volume of ethylene, the remainder consisting of nitrogen, was fed into the reaction vessel at 20 litres N. per hour.

An addition of 3 p.p.m. of dichloro-ethane was made to the gas mixture.

Operating at ambient pressure and at a temperature of 295° C., the effective contact period being 1.6 seconds, 38.4% of the ethylene put in was converted with 70.3% selectivity into ethylene oxide.

EXAMPLE 3

The procedure was precisely the same as in Example 1, the support used being alpha alumina in the form of spheres 8 mm. in diameter and having a surface area of less than 1 sq. m./g. and 26.5% porosity calculated in terms of water absorbed per gramme of dry support.

The resultant finished catalyst had a silver content of 13.0% by weight and contained platinum equivalent to 0.25% by weight in relation to the silver.

The porosity of the catalyst was 25% calculated in terms of water absorbed per gramme of catalyst.

EXAMPLE 4

A steel reaction vessel having an inside diameter of 9 mm. was charged with 27.35 g. of catalyst prepared as described in Example 3.

A gas mixture containing 6.6% by volume of oxygen and 5.9% of ethylene, the remainder consisting of nitrogen, was fed into the reaction vessel at 34.8 litres N. per hour.

An addition of a few p.p.m. of dichloro-ethane was made to the gas mixture.

Operating at a temperature of 265° C. and a pressure of 4 atmospheres absolute, the effective contact period being 5.5 seconds, 34% of the ethylene was converted with 71% selectivity into ethylene oxide.

EXAMPLE 5

The catalyst described in Example 3 was used, this being put into a reaction vessel having an inside diameter of 9 mm. The experiment used 27.35 g. of catalyst.

A gas mixture containing 6.4% by volume of ethylene, 7.9% of oxygen, 19% of methane and 6.6% of carbon dioxide, the remainder consisting of nitrogen, was fed into the reaction vessel at the rate of 12 litres N. per hour.

Operating at 260° C. and atmospheric pressure, 53.4% of the ethylene was converted with 73% selectivity into ethylene oxide.

We claim:

1. A method for preparing a supported catalyst for use in oxidizing ethylene to ethylene oxide, said supported catalyst consisting essentially of silver to the extent of 7 to 30% by weight with respect to the support, and of a member selected from the group consisting of platinum, palladium and gold to an extent of from 0.01 to 1.0% by weight with respect to said silver, which comprises:
    (a) impregnating a solid, inert subdivided support, at a temperature of from 60° C. to 115° C., with a solution of silver lactate in lactic acid containing in suspension, carbon and at least one metal selected from the group consisting of palladium, platinum and gold, said lactic acid being present in a molar excess of from 20% to 200% with respect to the number of mols required for complete salification of said silver,
    (b) drying the particles thus impregnated in a stream of air at a temperature rising to a maximum, but not exceeding 130° C. for a period of from 1 to 3 hours, and
    (c) subjecting the particles thus impregnated to a heat treatment, said temperature being raised gradually to a maximum level of between 230° C. and 360° C. over a period of 10 to 15 hours, said carbon in Step (a) being present in an amount ranging from 1 to 20 parts per 100 parts by weight of said silver.

2. The method of claim 1, wherein said carbon in Step (a) is a member selected from the group consisting of animal carbon, palladium carbon, and platinum carbon, said carbon having a grain size of from 0.1 to 100 microns.

3. The method of claim 1, wherein said support is a member selected from the group consisting of silicon carbide, alumina, magnesium oxide, and the combinations of said supports, said supports being in the form of spheres having a diameter of between 4 and 9 mm.

4. The method of claim 1, wherein said support employed is an alpha alumina support which has been subjected to an activation treatment at temperatures above 1000° C., said support having a surface area of from 0.01 to 1.0 sq. m./g. at a porosity of 10% to 40%, the mean diameter of the pores ranging from 30 to 150 microns.

5. The method of claim 4, wherein said porosity of said support is 26.5%.

References Cited
UNITED STATES PATENTS

| | | | |
|---|---|---|---|
| 2,615,900 | 10/1952 | Sears | 260—348.5 |
| 2,901,441 | 8/1959 | Waterman | 252—463 |

FOREIGN PATENTS

| | | |
|---|---|---|
| 1,115,192 | 5/1968 | England. |

DANIEL E. WYMAN, Primary Examiner

P. M. FRENCH, Assistant Examiner

U.S. Cl. X.R.

252—44 F